United States Patent
Schroeder et al.

(10) Patent No.: US 11,656,165 B2
(45) Date of Patent: May 23, 2023

(54) OPTICAL FLOW MEASURING CELL AND MEASURING DEVICE COMPRISING THE FLOW MEASURING CELL

(71) Applicants: Max Planck Society, Munich (DE); Otto-von-Guericke University Magdeburg, Magdeburg (DE)

(72) Inventors: Torsten Schroeder, Strassfurt OT Uellnitz (DE); Franz Detlef, Merseburg (DE); Erik Temmel, Magdeburg (DE); Steve Haltenhof, Magdeburg (DE); Andreas Wuensch, Stuttgart (DE); René Ebling, Stuttgart (DE)

(*) Notice: Subject to any disclaimer, the term of this patent is extended or adjusted under 35 U.S.C. 154(b) by 133 days.

(21) Appl. No.: 17/041,511

(22) PCT Filed: Mar. 27, 2019

(86) PCT No.: PCT/EP2019/057665
§ 371 (c)(1),
(2) Date: Sep. 25, 2020

(87) PCT Pub. No.: WO2019/185679
PCT Pub. Date: Oct. 3, 2019

(65) Prior Publication Data
US 2021/0010919 A1    Jan. 14, 2021

(30) Foreign Application Priority Data
Mar. 27, 2018 (DE) .................... DE102018107323.2

(51) Int. Cl.
*G01N 15/00* (2006.01)
*G01N 15/02* (2006.01)
*G01N 21/05* (2006.01)

(52) U.S. Cl.
CPC ......... *G01N 15/0227* (2013.01); *G01N 21/05* (2013.01)

(58) Field of Classification Search
CPC .......................... G01N 15/0227; G01N 21/05
See application file for complete search history.

(56) References Cited

U.S. PATENT DOCUMENTS

| | | | | |
|---|---|---|---|---|
| 3,728,032 A * | 4/1973 | Noll | ....... | G01N 21/05 250/435 |
| 5,213,109 A * | 5/1993 | Susi | ....... | A61B 5/097 73/23.3 |
| 9,267,876 B2 * | 2/2016 | Kang | ....... | G01N 21/05 |
| 2013/0215412 A1 * | 8/2013 | Wynn | ....... | G01N 1/10 356/440 |
| 2020/0316603 A1 * | 10/2020 | Kashanin | ...... | B01L 3/502761 |

* cited by examiner

Primary Examiner — Rebecca C Bryant

(57) ABSTRACT

The invention relates to a measuring cell for analysing a fluid flow, wherein the measuring cell has a channel for conducting the fluid flow, which channel is divided into different sections and the cross section thereof is perpendicular to a longitudinal axis. The invention also relates to a measuring device comprising such a measuring cell.

20 Claims, 4 Drawing Sheets

Figure 1:
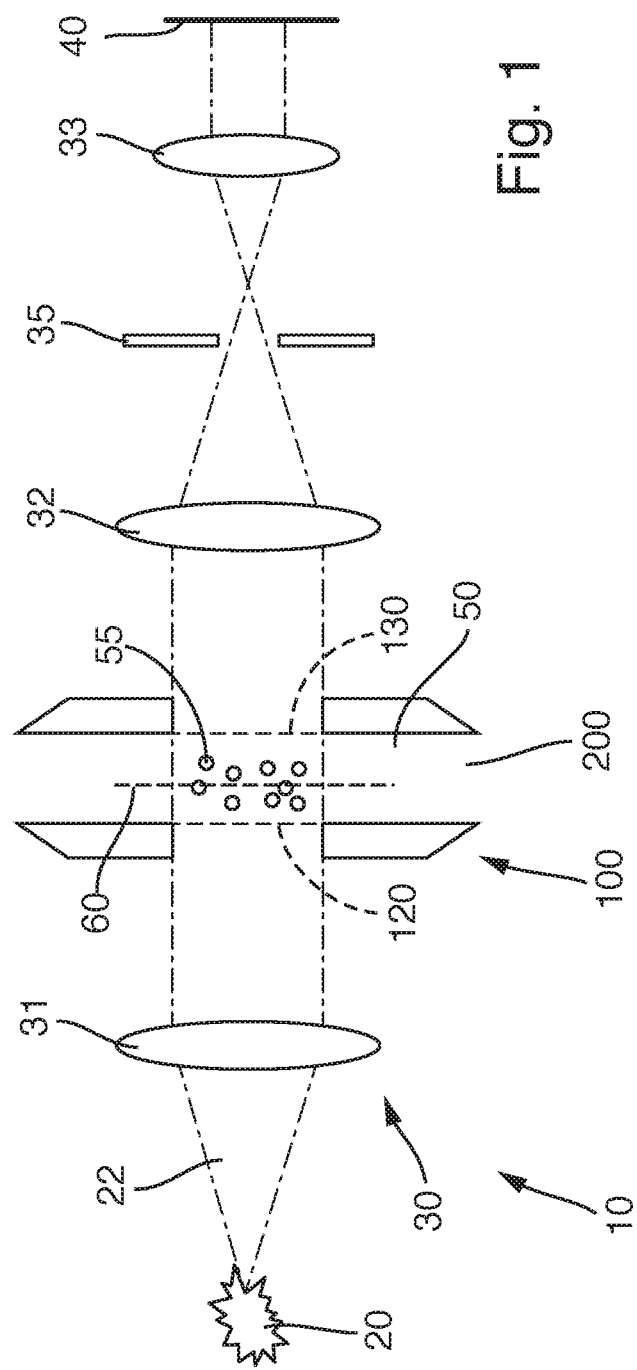

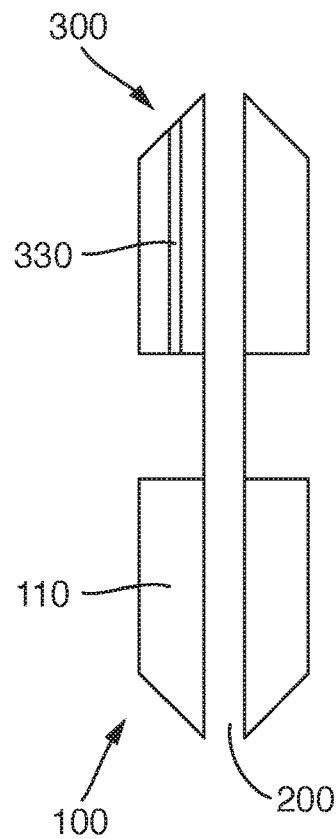
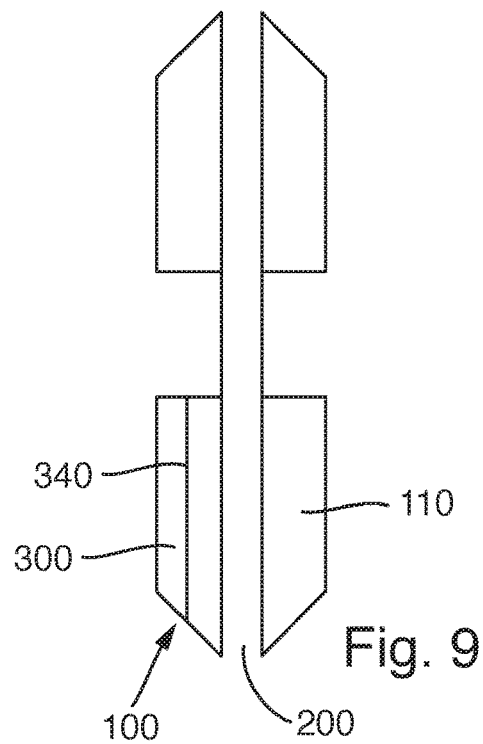
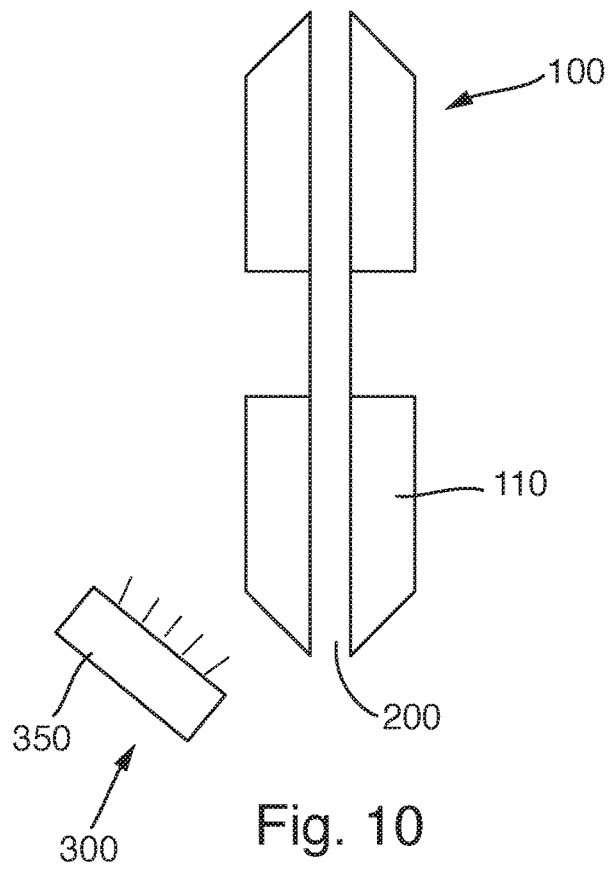
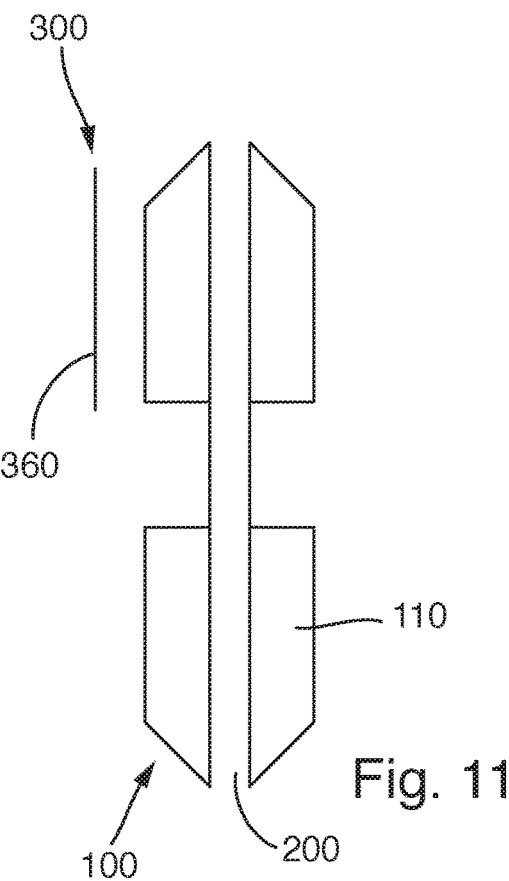
Fig. 8
Fig. 9
Fig. 10
Fig. 11

OPTICAL FLOW MEASURING CELL AND MEASURING DEVICE COMPRISING THE FLOW MEASURING CELL

The invention relates to a measuring cell for investigating a fluid flow.

The measuring cell has a main body and a channel, leading through the main body, for the fluid flow. In the main body there are formed to the sides of the channel at least a first viewing window and a second viewing window, which at least partially overlap.

The invention relates furthermore to a measuring device with such a measuring cell and also with an evaluation device.

Measuring cells of the type in question are used to investigate fluid flows. For this purpose, such a fluid flow can in particular be conducted through the channel.

A typical application area here is the analysis of crystallization processes. For example, a continuous measurement of a crystal size distribution can be performed.

Within a measuring device, a measuring cell may be used in particular together with a light source and a camera module and also possibly with optical elements such as lenses, the light source producing a light beam through the viewing windows of the measuring cell and this light beam being detected by the camera module after passing through the viewing windows. From data correspondingly obtained, a crystal size distribution can be extracted, for example by way of image analysis algorithms.

It has been found in the case of flow measuring cells known from the prior art that, for many measuring tasks, they are only suitable to a limited extent, since they cause effects in the fluid flow, such as for example a precipitation of crystals or sedimentation, with the result that measurements are affected.

It is therefore an object of the invention to provide an alternative, for example better, measuring cell for investigating a fluid flow in comparison with the prior art. It is furthermore an object of the invention to provide a measuring device with such a measuring cell.

This is achieved according to the invention by a measuring cell and also a measuring device according to the respective main claims. Advantageous configurations can be taken for example from the respective subclaims. The content of the claims is made the content of the description by express reference.

The invention relates to a measuring cell for investigating a fluid flow.

The measuring cell has a main body.

The measuring cell has a channel, leading through the main body, for the fluid flow, the channel having at least one inlet portion, a measuring portion and a diffuser portion lying between the inlet portion and the measuring portion.

The channel may be understood as meaning in particular an elongate cavity, which extends through the main body.

The inlet portion has an inlet opening for introducing the fluid flow into the channel.

A cross-sectional area of the channel increases in size in the diffuser portion toward the measuring portion.

Formed in the main body to the sides of the measuring portion of the channel are at least a first viewing window and a second viewing window, which at least partially overlap. The viewing windows may in this case be realized in particular by transparent elements, such as for example glass or plastic. The overlapping arrangement can achieve the effect in particular that a light beam can pass straight through both viewing windows and through the channel in between, in particular in order to analyze a fluid flow flowing through the channel.

The viewing windows may also overlap completely.

According to the invention, it is provided that a cross section of the channel in the inlet portion, in the diffuser portion and in the measuring portion is in each case transverse to a common longitudinal axis. This allows best possible rectilinear propagation of the fluid flow in the channel, whereby in particular formation of dead spaces and precipitation of undesired sediments are prevented.

It should be understood that the fluid flow does not represent part of the measuring cell, but rather the measuring cell is formed for the purpose that such a fluid flow is conducted through it.

The longitudinal axis preferably forms an axis of symmetry of the channel. This allows a particularly advantageous flow to be achieved.

The longitudinal axis is formed in particular as rectilinear.

The channel preferably has a round cross section in the inlet portion. As a result, an advantageous take-up of the fluid flow into the channel is achieved, a desired form for the measuring portion only being set after the inlet portion.

The channel preferably has in the inlet portion a diameter of 3 mm to 5 mm, or particularly preferably a diameter of 4 mm. Such values have proven to be advantageous in practice, though it should be mentioned that other values can also be used.

The channel preferably has between the inlet portion and the diffuser portion a form-changing portion, in which a cross section of the channel changes into a slotted form toward the diffuser portion. A cross section of the channel in the form-changing portion is preferably transverse to the common longitudinal axis. This allows the form of the channel to be changed, in particular smoothly, into a form that is desired in the diffuser portion and/or in the measuring portion. A length of the form-changing portion along the longitudinal axis is preferably less than a length of the diffuser portion along the longitudinal axis. Particularly preferably, the length of the form-changing portion is less than half or a third of the length of the diffuser portion.

Preferably, in the diffuser portion a depth of the channel remains constant. Preferably, in the diffuser portion a width of the channel widens. This allows an advantageous flow profile to be achieved, it being possible in particular for a flow to be slowed down. The depth indicates in particular an extent of the channel perpendicular to the viewing windows and/or between the viewing windows and/or transverse to the viewing windows. The width indicates in particular an extent of the channel transverse to the depth and transverse to the longitudinal axis.

Preferably, the width widens with an angle between 50° and 56°, particularly preferably 53°. This may take place in particular in the diffuser portion, it being possible that the diffuser portion preferably provides a uniform widening. Such an angle between 50° and 56° may be adopted in particular between diffuser lateral axes or outer edges of the diffuser portion.

For example, an angle of 27° may be adopted by the longitudinal axis in relation to the respective outer edges or diffuser lateral axes of the diffuser portion.

According to a preferred embodiment, the channel also has a size-reducing portion adjoining the measuring portion opposite from the diffuser portion and also further preferably an outlet portion adjoining the size-reducing portion opposite from the measuring portion. A cross section of the channel in the outlet portion is in this case preferably smaller than in the measuring portion and preferably becomes smaller from the measuring portion to the outlet portion in the size-reducing portion. This allows the flow profile to be changed again for the outlet of the fluid from the channel.

Preferably, the outlet portion has an outlet opening for conducting the fluid flow out of the channel. In the size-reducing portion and/or in the outlet portion, a cross section of the channel is preferably in each case transverse to the common longitudinal axis.

The channel preferably has between the size-reducing portion and the outlet portion a further form-changing portion, in which a cross section of the channel changes toward the size-reducing portion, preferably into a slotted form. In the further form-changing portion, a cross section of the channel is preferably transverse to the common longitudinal axis. As a result, the flow of the fluid stream is advantageously retained. In the further form-changing portion, in particular the cross section may change again into a circular form toward the outlet portion. Preferably, a length of the further form-changing portion along the longitudinal axis is less than a length of the size-reducing portion along the longitudinal axis. Particularly preferably, the length of the further form-changing portion is less than half or a third of the length of the size-reducing portion.

The size-reducing portion is preferably formed mirror-invertedly in relation to the diffuser portion. The further form-changing portion is preferably formed mirror-invertedly in relation to the form-changing portion. The outlet portion is preferably formed mirror-invertedly in relation to the inlet portion. Such embodiments have proven to be advantageous, since they produce a flow profile that avoids undesired effects such as dead spaces and precipitation processes. The mirror-inverted form may in this case relate to a plane that is transverse to the longitudinal axis.

Preferably, the slotted form at the transition between the form-changing portion and the diffuser portion and/or at the transition between the size-reducing portion and the further form-changing portion has a width of 3.5 mm to 4.5 mm, or particularly preferably a width of 4 mm.

Preferably, the slotted form at the transition between the form-changing portion and the diffuser portion and/or at the transition between the size-reducing portion and the further form-changing portion has a lateral radius of 0.8 mm to 1.2 mm, or particularly preferably a lateral radius of 1 mm.

Preferably, the measuring portion has between the viewing windows a depth of more than 2 mm or more than 3 mm or more than 3.5 mm.

Preferably, the measuring portion has between the viewing windows a depth of less than 3 mm or less than 3.5 mm or less than 4 mm.

Preferably, the measuring portion has between the viewing windows a depth of 1.6 mm to 2.4 mm, or particularly preferably a depth of 2 mm.

Preferably, the measuring portion has a width of 12 mm to 16 mm, or particularly preferably a width of 14 mm.

With the values mentioned, particularly advantageous results have been achieved in practice, in particular with respect to the form of a suitable flow profile for an unfalsified measurement.

The cross section of the channel preferably has a constant slotted form in the measuring portion. This makes the formation of a uniform flow profile possible. The slotted form may have in particular a lateral radius of 0.8 mm to 1.2 mm, preferably 1 mm.

It should be understood that in the measuring portion a rectangular form or a round form may also be used for example as the cross section instead of a slotted form.

The measuring cell is preferably formed from materials that are chemically inert in a pH range between 5 and 8 or in a pH range between 1 and 8. As a result, damage to the measuring cell can be avoided with the typically occurring pH values of fluids or cleaning agents.

The invention relates furthermore to a measuring device. The measuring device has a measuring cell according to the invention, it being possible to take all of the described embodiments and variants as a basis again. The measuring device has an evaluation device, which is configured to evaluate a fluid flowing through the channel, suspensions and/or particles or suspensions and/or particles contained in the fluid by means of a light beam passed through the viewing windows. Suspensions and/or particles may in particular be contained in the fluid. By means of the measuring device according to the invention, the advantages already described with reference to the measuring cell can be achieved.

According to a development, it is provided that the measuring cell has a temperature-controlling device, by means of which a temperature of the channel can be influenced. This achieves the effect that the temperature of the channel, and consequently also of a fluid flow flowing through the channel, can be set to a value which for example prevents or suppresses precipitation of particles or other elements contained in the fluid flow on account of too low a temperature, and resultant falsification of a measurement.

The temperature-controlling device may be arranged in particular in the main body.

The configuration with the temperature-controlling device is based in particular on the recognition that measuring cells of the type in question typically form cold bridges from the surrounding area into the channel, which lead to a temperature low enough for precipitation of particles. It should however be mentioned that the configuration is not restricted to deliberately setting a high temperature, but that in specific applications a deliberately low temperature may also be set, or generally a temperature that is defined and consequently also reproducible.

In particular, a temperature of the fluid flow flowing through the channel can be influenced by means of the temperature-controlling device. As already mentioned, this allows undesired processes in the fluid flow to be prevented.

The main body may be advantageously formed from metal. However, other sufficiently stable materials, for example plastics, may also be used. It is also possible for different materials to be combined.

The temperature-controlling device may have a further channel, which is formed in the main body separately from the channel for conducting temperature-controlling fluid through. This makes it possible to conduct temperature-controlling fluid through the main body or the further channel, and consequently to provide a heat exchange between the temperature-controlling fluid and the main body, so that a temperature can be set.

According to a preferred configuration, the temperature-controlling device has a cavity which is formed in the main body separately from the channel for conducting temperature-controlling fluid through. Such a cavity may be in particular a cavity which completely or partially surrounds the channel. A temperature of the main body can be advantageously influenced or set by a heat exchange between the temperature-controlling fluid and the main body.

The cavity may be formed in particular between a first outer plate and a second outer plate. Preferably, in this case at least one of the plates is removable. It is also possible for both parts to be removable. This makes accessibility to the cavity possible for inspection purposes or other tasks.

The cavity may in particular surround the channel. This allows particularly good settability of the temperature to be achieved.

The temperature-controlling device preferably has a providing device for temperature-controlling fluid or is connected to a providing device for temperature-controlling fluid. Such a temperature-controlling fluid may be in particular water or else a gas. Other fluids, such as for example mixtures of liquids to which for example additives for preventing corrosion or for frost resistance may be added can similarly also be used, however. The providing device is in this case preferably formed in particular for bringing the temperature-controlling fluid to a defined temperature, for example heating it, before it is provided to the measuring cell. For this purpose, the temperature-controlling device may for example have heating elements or else have a heat exchanger for connection to an external heat source and/or heat sink.

According to one embodiment, the temperature-controlling device may have an electrical heating wire. According to a further embodiment, it may have an infrared heater. According to yet a further embodiment, the temperature-controlling device may have an induction heater. Such elements, that is to say in particular an electrical heating wire, an infrared heater or an induction heater, allow an increase in the temperature to be achieved directly at the measuring cell or in the main body. It should be understood that such embodiments can be combined with one another in any way and can also be combined with the use of a further channel or a cavity for temperature-controlling fluid.

Preferably, the temperature-controlling device is formed for bringing about an increase and/or a decrease in the temperature of the main body and/or the channel of at least 15 K per hour. Such a temperature ramp has proven to be advantageous in practice for typical applications.

According to a preferred embodiment, the temperature-controlling device has a temperature-monitoring device for sensing or controlling a temperature of components of the measuring cell. Consequently, the temperature set or reached can be monitored during the operation of the temperature-controlling device and, by a closed-loop control, for example by a PID controller, it can be ensured that, even in the event of changed ambient conditions or other influences, the desired temperature is reached as quickly as possible or is correctly set and maintained.

In the case of the measuring device according to the invention, the measuring cell may be formed in particular such that it has a further channel or a cavity for temperature-controlling fluid, the measuring device in this case also preferably having a providing device for temperature-controlling fluid. Consequently, the functionality of a temperature setting by means of a temperature-controlling fluid that has already been described further above can be realized in an advantageous way.

Figure 2:
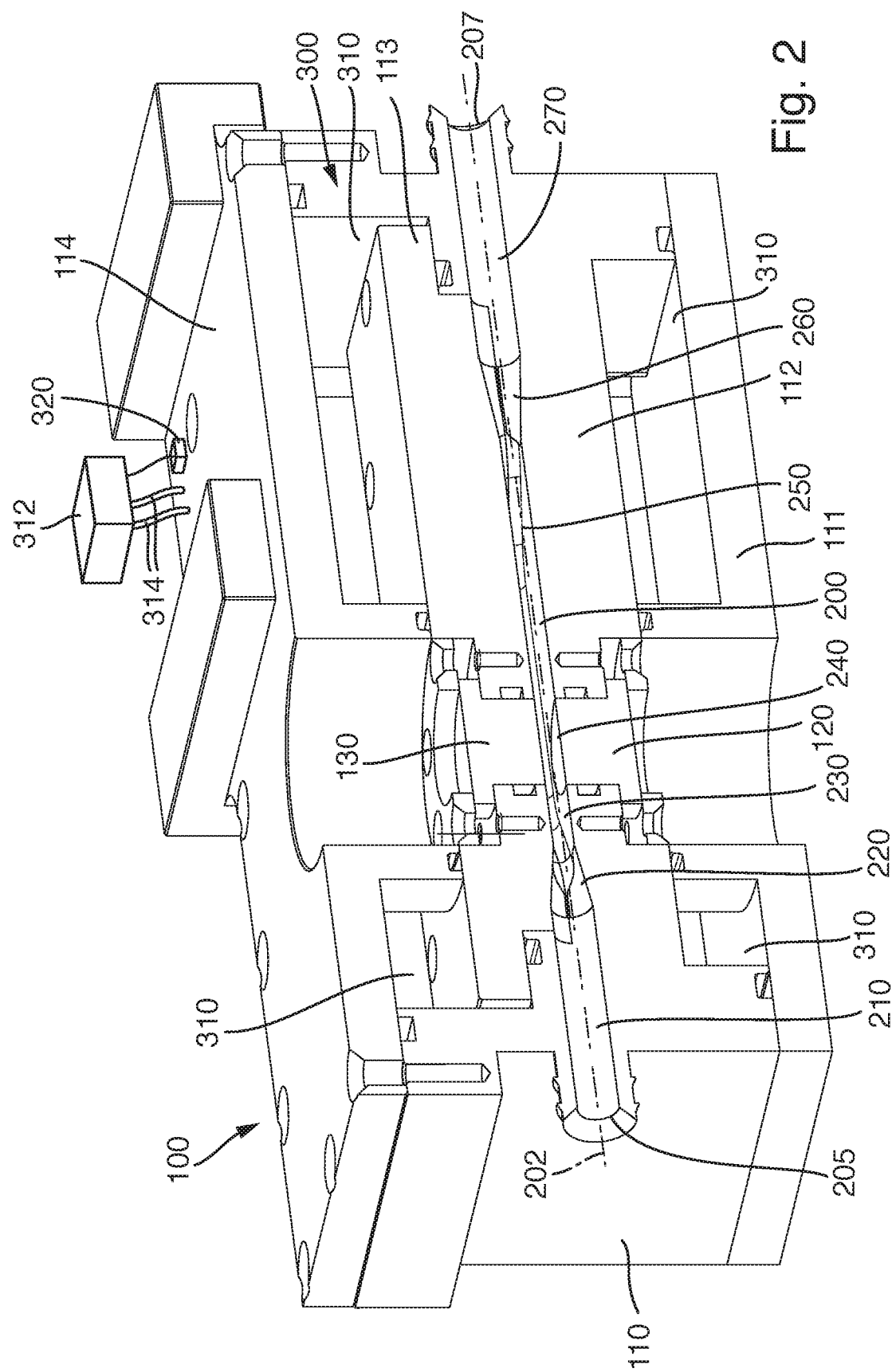
Figure 3:
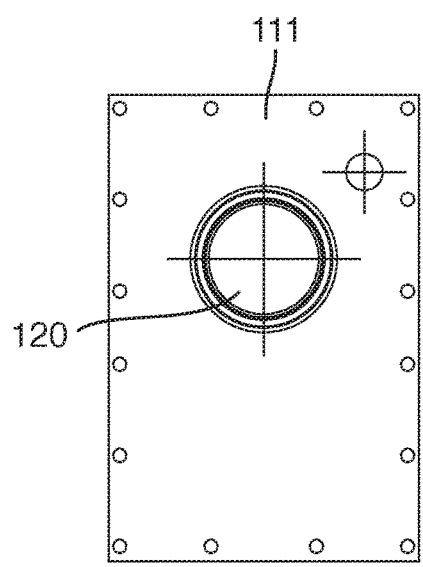
Figure 4:
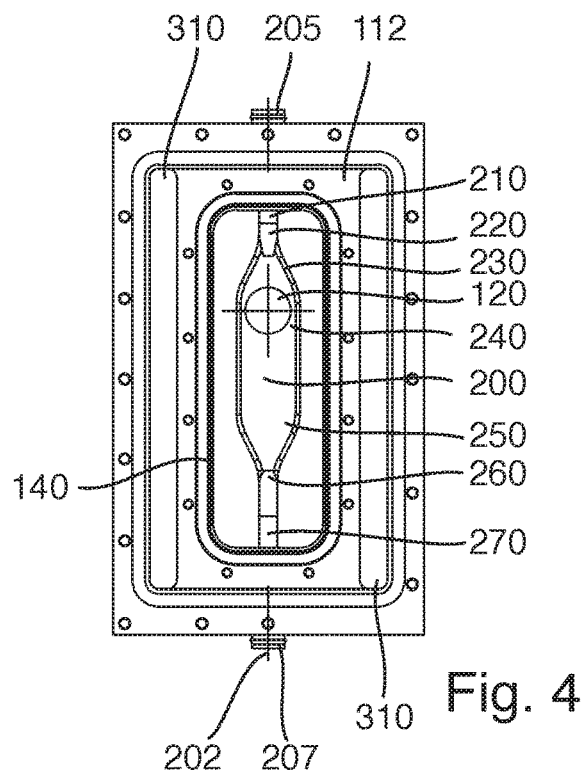
Figure 5:
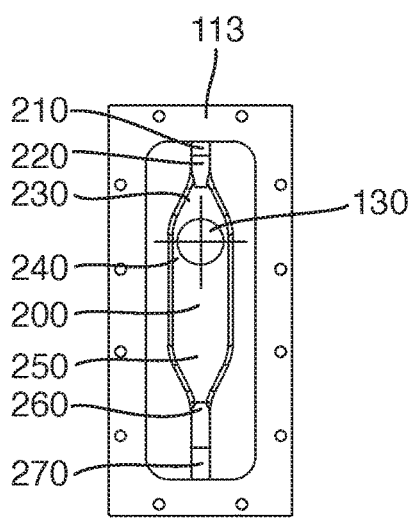
Figure 6:
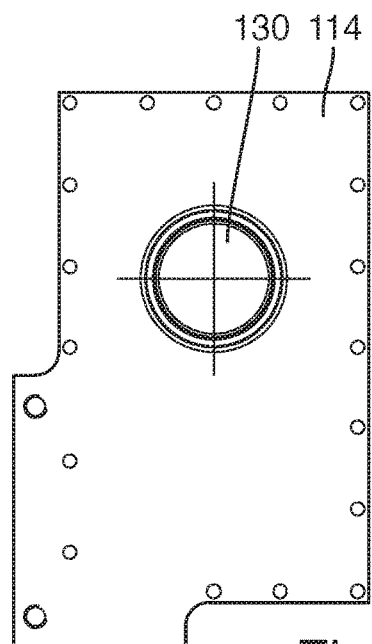
Figure 7:
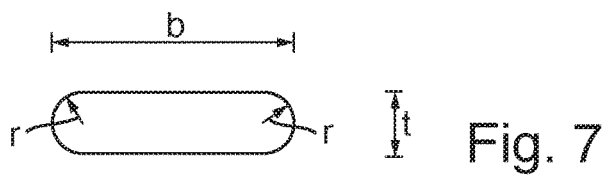

Further features and advantages will be taken by a person skilled in the art from the exemplary embodiments described below with reference to the appended drawing, in which:

FIG. 1: shows a measuring device in a schematic view,
FIG. 2: shows a measuring cell according to an exemplary embodiment in a perspective sectional view,
FIG. 3: shows a first outer plate,
FIG. 4: shows a first main element,
FIG. 5: shows a second main element,
FIG. 6: shows a second outer plate,
FIG. 7: shows a cross-sectional view of a slotted form,
FIG. 8: shows a schematic view of a measuring cell according to a further exemplary embodiment,
FIG. 9: shows a schematic view of a measuring cell according to yet a further exemplary embodiment,
FIG. 10: shows a schematic view of a measuring cell according to yet a further exemplary embodiment, and
FIG. 11: shows a schematic view of a measuring cell according to yet a further exemplary embodiment.

FIG. 1 shows a measuring device 10 according to an exemplary embodiment of the invention purely schematically.

The measuring device 10 has a light source 20, which emits a light beam 22. The light beam 22 is passed through an optical system 30, which has a first lens 31, a second lens 32 and a third lens 33.

The first lens 31 transforms the light beam 22 into a parallel beam. The second lens 32 focuses the light beam 22 through a diaphragm 35, after which the light beam 22 is transformed again into a parallel beam by the third lens 33.

The measuring device 10 has furthermore an evaluation device 40, which is impinged by the light beam 22 made parallel by the third lens 33. The evaluation device 40 is only schematically represented here. It is typically formed as a detector, which can obtain information from the light beam 22, for example by image processing or image recognition.

Arranged between the first lens 31 and the second lens 32 is a measuring cell 100. It may be in particular a measuring cell 100 as described herein or as described with reference to the further figures and as represented in these figures.

In FIG. 1, the measuring cell 100 is however only schematically represented.

In the measuring cell 100, a first viewing window 120 and a second viewing window 130 are formed. These overlap. With parallel beam guidance, the light beam 22 enters the measuring cell 100 through the first viewing window 120 and leaves through the second viewing window 130.

A channel 200 leads through the measuring cell 100. A fluid or a fluid flow 50 can be conducted through this channel 200, it being possible for this fluid flow 50 to contain particles 55, which are to be detected by means of the measuring device 10. These may be for example crystals, which can occur in various crystallization processes.

An object plane 60, in which or around which a measurement of the particles 55 in the fluid flow can be performed, is therefore defined in the measuring cell 100. The object plane 60 corresponds in the present case to the longitudinal axis mentioned further below.

FIG. 2 shows a measuring cell 100 according to an exemplary embodiment of the invention.

The measuring cell 100 has a main body 110, through which a channel 200 extends.

The main body 110 is divided into a first outer plate 111, a first main element 112, a second main element 113 and also a second outer plate 114.

The first main element 112 and the second main element 113 are in this case arranged between the two outer plates 111, 114. The components 111, 112, 113, 114 mentioned are screwed together and sealed with respect to one another.

In this case, the second main element 113 is screwed directly to the first main element 112, the channel 200 being formed by corresponding clearances in these two main elements 112, 113. This is discussed more specifically further below.

The outer plates 111, 114 are screwed directly to the first main element 112.

The channel 200 extends along a longitudinal axis 202. The longitudinal axis 202 is in this case defined such that a cross section of the channel 200 is in each case transverse to the longitudinal axis 202. This applies to all the regions of the channel 200 that are represented.

The longitudinal axis 202 forms furthermore at each point of the channel 200 an axis of symmetry of the channel 200. In other words, the cross section of the channel 200 is at each point not only transverse to the longitudinal axis 22 but also symmetrical with respect to this longitudinal axis 202.

The channel 200 has firstly an inlet opening 205, through which fluid can flow in. This allows the fluid flow already mentioned with reference to FIG. 1 to be formed in the channel 200.

Directly adjoining the inlet opening 205, the channel 200 has an inlet portion 210. In the inlet portion 210, the channel 200 has a round cross section.

Further portions of the channel 200 are now described below, proceeding to the right from the inlet portion 210 with reference to FIG. 2.

Arranged adjoining the inlet portion 210 is a form-changing portion 220. In the form-changing portion 220, the cross section of the channel 200 changes from a circular form to a slotted form. Such a slotted form is represented by way of example in FIG. 7 and is described further below.

Arranged adjoining the form-changing portion 220 is a diffuser portion 230. In the diffuser portion 230, the cross section of the channel 200 remains in a slotted form, but increases the size of its cross-sectional area. This is achieved in particular by a width transverse to the sectional plane of the representation from FIG. 2 continuously increasing in size. This increase in size takes place in this case with a diffuser angle, which in the present case has a value of 27° in relation to the longitudinal axis 202. It should however be understood that other angles can also be used.

In the diffuser portion 230, a flow rate of the fluid flowing through the channel 200 is reduced and particles that are possibly contained are distributed over a greater cross section. This facilitates the measurement and also effectively prevents precipitation or adsorption of particles or other undesired substances.

Following the diffuser portion 230, a measuring portion 240 is formed. Arranged to the sides of the measuring portion 240 are a first viewing window 120 and a second viewing window 130. As shown, these are formed in the first main element 112 and the second main element 113 as transparent elements. Transparent glass or transparent plastic may be used in particular for this. The light beam 22 represented in FIG. 1 can enter and leave through the viewing windows 120, 130. For this purpose, the two viewing windows 120, 130 overlap, so that is possible for the light beam 22 to pass through the two viewing windows 120, 130 and also through the channel 200 at its measuring portion 240.

The channel 200 then extends further up to a size-reducing portion 250. The size-reducing portion 250 is formed mirror-invertedly in relation to the diffuser portion 230 with respect to a plane that is not represented. In the size-reducing portion 250, the cross section of the channel 200 decreases in size, it being given a slotted form in this size-reducing portion 250. For this purpose, in particular the width of the slotted form transverse to the sectional plane of the representation from FIG. 2 decreases.

Adjoining the size-reducing portion 250, the channel 200 has a further form-changing portion 260. In this portion, the form of the cross section of the channel 200 changes once again from a slotted form to a circular form.

Arranged adjoining the further form-changing portion 260 is an outlet portion 270, in which the channel 200 has a round cross section. The outlet portion 270 ends in an outlet opening 207, through which the fluid can leave the channel 200 again.

Formed surrounding the channel 200 in the present case is a temperature-controlling device 300. The temperature-controlling device 300 serves the purpose of setting the temperature of the channel 200.

The temperature-controlling device 300 has in the present case a cavity 310, which is formed both between the second main element 113 and the second outer plate 114 and also between the first main element 112 and the first outer plate 111. Furthermore, the cavity 310 is also formed laterally in relation to the channel 200, so that it connects the regions represented. Consequently, the channel 200 is surrounded almost completely by the cavity 310.

The temperature-controlling device 300 has furthermore a providing device 312 for temperature-controlling fluid. The providing device 312 is connected to the cavity 310 by way of lines 314. This allows temperature-controlling fluid, in particular water, to be brought to a specific temperature and then to be conducted into the cavity 310 and also conducted out of it again.

It should be understood that here the temperature-controlling device 312 and also the lines 314 are represented purely schematically. The temperature-controlling device 312 can in particular have a heating element in order to heat the temperature-controlling fluid.

The temperature-controlling device 300 has furthermore a temperature-monitoring device 320 in the form of a temperature sensor. This temperature sensor is attached to the main body 110 and monitors its temperature. This allows a closed-loop control of the temperature of the main body 110, and consequently also of the channel 200 to be realized.

Since the elements of the main body 110 are formed entirely or at least substantially from metal, the main body 110 has altogether a high thermal conductivity. Consequently, a good heat transfer and uniform temperature control can be assumed.

As already mentioned, the two outer plates 111, 114 are screwed. This means in particular that they are removable, so that the cavity 310 is accessible, for example for inspection purposes.

FIG. 3 shows the first outer plate 111 separately in a plan view. In this case, the region in which the first viewing window 120 is formed can be seen.

FIG. 4 shows the first main element 112 separately in a plan view, the second main element 113 having been removed. This reveals the clearance that forms the channel 200. The portions, 210, 220, 230, 240, 250, 260, 270 already explained with reference to FIG. 2 can be clearly seen. Furthermore, the first viewing window 120 can be seen.

FIG. 4 likewise shows that the cavity 310 is formed laterally in relation to the channel 200, so that the cavity 310 surrounds the channel 200 virtually completely.

The first main element 112 has furthermore a peripheral seal 140, which in the present case is designed in the form of a rubber seal. The second main element 113 may be placed onto the first main element 112 such that the two elements 112, 113 can be screwed together and the channel 200 is sealed on all sides along the seal 140.

With respect to further details, reference should be made to FIG. 4 and also in the case of the other figures to the detailed description above of FIG. 2.

FIG. 5 shows the second main element 113 separately in a plan view. In this case, the channel 200 with its already explained portions 210, 220, 230, 240, 250, 260, 270 can likewise be seen. Furthermore, the second viewing window 130 can be seen. As already mentioned, the second main element 113 is placed onto the first main element 112 and screwed to it. As a result, the channel 200 is formed in its final, sealed form FIG. 6 shows the second outer plate 114 separately in a plan view. In this case, the second viewing window 130 can be seen.

It should be understood that, in FIGS. 3 to 6, respective circles of the same diameter are depicted, representing holes through which the components 111, 112, 113, 114 can be screwed together. Since the functionality of these holes is obvious, they are not separately denoted by reference signs in the interests of better legibility. The holes can moreover also be seen in FIG. 2.

FIG. 7 shows a slotted form, as it occurs in particular in the measuring portion 240, in the diffuser portion 230 and in the size-reducing portion 250 of the channel 200. In this case, the width b is depicted, increasing in the diffuser portion 230 and decreasing in the size-reducing portion 250.

As shown, a slotted form is in principle characterized in that between two lateral semicircles of identical radius r there is a portion of constant depth, which directly and/or steplessly adjoins the semicircles.

Depicted furthermore is also a depth t, which remains constant in the diffuser portion 230, in the measuring portion 240 and in the size-reducing portion 250.

The lateral radii r, which define the rounding at the sides, can also be seen.

In the exemplary embodiment represented here, the slotted form in the measuring portion 240 has in the present case a width b of 14 mm, a lateral radius r of 1 mm and also a depth t of 2 mm. In the inlet portion 210 and in the outlet portion 270, the channel 200 has in this exemplary embodiment a diameter of 4 mm. At the transition between the form-changing portion 220 and the diffuser portion 230 and also at the transition between the size-reducing portion 250 and the further form-changing portion 260, the channel 200 has in this exemplary embodiment a width b of 4 mm. Such values have been found to be particularly advantageous for typical applications. However, it should be mentioned that these values are only given by way of example and other embodiments are also possible.

FIG. 8 shows purely schematically a measuring cell 100 according to a further exemplary embodiment. In a modification with respect to the exemplary embodiment of FIGS. 2 to 6, the temperature-controlling device 300 is in this case designed in the form of a further channel 330, which is formed in the main body 110 alongside the channel 200. Temperature-controlling fluid can be conducted through this further channel 330, in order to set a temperature in a similar way to by means of the cavity 310.

FIG. 9 shows purely schematically a measuring cell 100 according to a still further exemplary embodiment. In this case, the temperature-controlling device 300 is designed in the form of a heating wire 340, through which electrical current for heating the main body 110 or the channel 200 can be passed.

FIG. 10 shows purely schematically a measuring cell 100 according to a still further exemplary embodiment. In this case, the temperature-controlling device 300 is designed as an infrared heater 350, which is formed as an infrared radiator, which emits infrared radiation onto the main body 110.

FIG. 11 shows purely schematically a measuring cell 100 according to a still further exemplary embodiment. The temperature-controlling device 300 is in this case formed as an induction heater 360, which is arranged alongside the main body 110 and to which an alternating current can be applied, so that heating of the main body 110 takes place by way of an alternating electromagnetic field.

It should be pointed out once again that the representations of FIGS. 8 to 11 should be understood as purely schematic, in order to show different embodiments of the temperature-controlling device 300. It should be understood that the embodiments of the temperature-controlling device 300 that are shown in FIGS. 2 to 11 can also be combined with one another in any way.

The claims that are part of the application do not represent any renouncement of the attainment of further protection.

If it is found in the course of proceedings that a feature or a group of features is not absolutely necessary, then the applicant aspires right now to a wording for at least one independent claim that no longer has the feature or the group of features. This may be for example a subcombination of a claim available on the filing date or may be a subcombination of a claim available on the filing date that is restricted by further features. Claims or combinations of features of this kind requiring rewording are intended to be understood to be covered by the disclosure of this application as well.

It should further be pointed out that configurations, features and variants of the invention that are described in the various embodiments or exemplary embodiments and/or shown in the figures are combinable with one another in any way. Single or multiple features can be interchanged with one another in any way. Combinations of features arising therefrom are intended to be understood to be covered by the disclosure of this application as well.

Back-references in dependent claims are not intended to be understood as dispensing with the attainment of independent substantive protection for the features of the back-referenced subclaims. These features can also be combined with other features in any way.

Features that are disclosed only in the description or features that are disclosed in the description or in a claim only in conjunction with other features may fundamentally be of independent significance essential to the invention. They can therefore also be individually included in claims for the purpose of distinction from the prior art.

The invention claimed is:

1. A measuring cell for investigating a fluid flow comprising:
    a main body,
    a channel, leading through the main body, for the fluid flow,
    wherein the channel has at least one inlet portion, a measuring portion and a diffuser portion lying between the inlet portion and the measuring portion,
    wherein the inlet portion has an inlet opening for introducing the fluid flow into the channel,
    wherein a cross-sectional area of the channel increases in size in the diffuser portion toward the measuring portion,
    wherein in the main body there are formed to the sides of the measuring portion of the channel at least a first viewing window and a second viewing window, wherein the first viewing window and second viewing window are arranged such that a light beam can pass through both viewing windows and the measuring portion of the channel,
    wherein a cross section of the channel in the inlet portion, in the diffuser portion and in the measuring portion is in each case transverse to a common longitudinal axis,
    wherein the channel has between the inlet portion and the diffuser portion a form-changing portion, in which a cross section of the channel changes into a slotted form toward the diffuser portion, wherein the slotted form comprises two lateral semicircles of identical radius with an area of constant depth adjoining the semicircles, and wherein a cross section of the channel in the form-changing portion is transverse to the common longitudinal axis.

2. The measuring cell as claimed in claim 1, wherein the longitudinal axis forms an axis of symmetry of the channel.

3. The measuring cell as claimed in claim 1, wherein the channel has a round cross section in the inlet portion.

4. The measuring cell as claimed in claim 3, wherein the channel has in the inlet portion a diameter of 3 mm to 5 mm.

5. The measuring cell as claimed in claim 1, wherein in the diffuser portion a depth of the channel remains constant and a width of the channel widens, wherein the depth indicates an extent of the channel perpendicular to the viewing windows and/or between the viewing windows and the width indicates an extent of the channel transverse to the depth and transverse to the longitudinal axis.

6. The measuring cell as claimed in claim 5, wherein the width widens with an angle between 50° and 56°.

7. The measuring cell as claimed in claim 1, wherein the channel also has a size-reducing portion adjoining the measuring portion opposite from the diffuser portion and an outlet portion adjoining the size-reducing portion opposite from the measuring portion, wherein a cross section of the channel in the outlet portion is smaller than in the measuring portion and becomes smaller from the measuring portion to the outlet portion in the size-reducing portion, wherein the outlet portion has an outlet opening for conducting the fluid flow out of the channel, and wherein, in the size-reducing portion and in the outlet portion, a cross section of the channel is in each case transverse to the common longitudinal axis.

8. The measuring cell as claimed in claim 7, wherein the size-reducing portion is formed as a mirror image in relation to the diffuser portion.

9. The measuring cell as claimed in claim 7, wherein the outlet portion is formed as a mirror image in relation to the inlet portion.

10. The measuring cell as claimed in claim 7, wherein the channel has between the size-reducing portion and the outlet portion a further form-changing portion, in which a cross section of the channel changes toward the size-reducing portion, into a slotted form, wherein the slotted form comprises two lateral semicircles of identical radius with an area of constant depth adjoining the semicircles, and wherein, in the further form-changing portion, a cross section of the channel is transverse to the common longitudinal axis.

11. The measuring cell as claimed in claim 10, wherein the further form-changing portion is formed as a minor image in relation to the form-changing portion.

12. The measuring cell as claimed in claim 10, wherein the slotted form at the transition between the size-reducing portion and the further form-changing portion has a width of 3.5 mm to 4.5 mm.

13. The measuring cell as claimed in claim 10, wherein the slotted form at the transition between the size-reducing portion and the further form-changing portion has a lateral radius of 0.8 mm to 1.2 mm.

14. The measuring cell as claimed in claim 1, wherein the slotted form at the transition between the form-changing portion and the diffuser portion has a width of 3.5 mm to 4.5 mm.

15. The measuring cell as claimed in claim 1, wherein the slotted form at the transition between the form-changing portion and the diffuser portion has a lateral radius of 0.8 mm to 1.2 mm.

16. The measuring cell as claimed in claim 1, wherein the measuring portion has between the viewing windows a depth of more than 2 mm or more than 3 mm or more than 3.5 mm, and/or wherein the measuring portion has between the viewing windows a depth of less than 3 mm or less than 3.5 mm or less than 4 mm, and/or wherein the measuring portion has between the viewing windows a depth of 1.6 mm to 2.4 mm.

17. The measuring cell as claimed in claim 1, wherein the measuring portion has a width of 12 mm to 16 mm.

18. The measuring cell as claimed in claim 1, wherein the cross section of the channel has the slotted form in the measuring portion.

19. The measuring cell as claimed in claim 1, which is formed from materials that are chemically inert in a pH range between between 1 and 8.

20. A measuring device, having a measuring cell as claimed in claim 1, and an evaluation device, which is configured to evaluate a fluid flowing through the channel and/or suspensions and/or particles contained therein by means of a light beam passed through the viewing windows.

\* \* \* \* \*